(12) United States Patent
Abeygunawardana et al.

(10) Patent No.: US 11,465,081 B2
(45) Date of Patent: Oct. 11, 2022

(54) WATER FILTERING AND RECYCLING SYSTEM FOR ICE MAKING APPLIANCE

(71) Applicant: Haier US Appliance Solutions, Inc., Wilmington, DE (US)

(72) Inventors: Danister Abeygunawardana, Louisville, KY (US); Andrew Reinhard Krause, Louisville, KY (US); Bradley Nicholas Gilkey, Louisville, KY (US); Gregory Sergeevich Chernov, Louisville, KY (US); Charles Benjamin Miller, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 271 days.

(21) Appl. No.: 16/456,283

(22) Filed: Jun. 28, 2019

(65) Prior Publication Data

US 2020/0406172 A1    Dec. 31, 2020

(51) Int. Cl.
*B01D 35/30* (2006.01)
*F25D 23/12* (2006.01)
*C02F 1/00* (2006.01)
*B01D 24/00* (2006.01)
*B01D 46/24* (2006.01)

(52) U.S. Cl.
CPC ........... *B01D 35/30* (2013.01); *B01D 24/002* (2013.01); *B01D 24/005* (2013.01); *C02F 1/001* (2013.01); *F25D 23/126* (2013.01); *B01D 46/2403* (2013.01); *B01D 2201/316* (2013.01); *F25C 2300/00* (2013.01); *F25C 2400/10* (2013.01); *F25D 2323/121* (2013.01)

(58) Field of Classification Search
CPC ... B01D 24/002; B01D 24/005; B01D 24/007
USPC ........................................ 210/264, 284–287
See application file for complete search history.

(56) References Cited

U.S. PATENT DOCUMENTS

| | | | |
|---|---|---|---|
| 5,160,607 A * | 11/1992 | Thiemer ................ | B01D 35/26 210/128 |
| 6,572,769 B2 | 6/2003 | Rajan et al. | |
| 2018/0001240 A1 | 1/2018 | Chernov et al. | |
| 2018/0128530 A1 * | 5/2018 | Mitchell ................. | C02F 1/283 |

* cited by examiner

*Primary Examiner* — Benjamin M Kurtz
(74) *Attorney, Agent, or Firm* — Dority & Manning, P.A.

(57) ABSTRACT

A water filter assembly may include a filter body having vertical side walls that defines a cavity within which one or more filter layers may be housed, the filter body further including a plurality of vertical barriers that define a plurality of flow paths that converge on an outlet hole, the vertical barriers further including a plurality of cutouts defining alternative overflow paths permitting water therethrough, and each filter layer including a plurality of vertical barriers that define a plurality of flow paths.

19 Claims, 14 Drawing Sheets

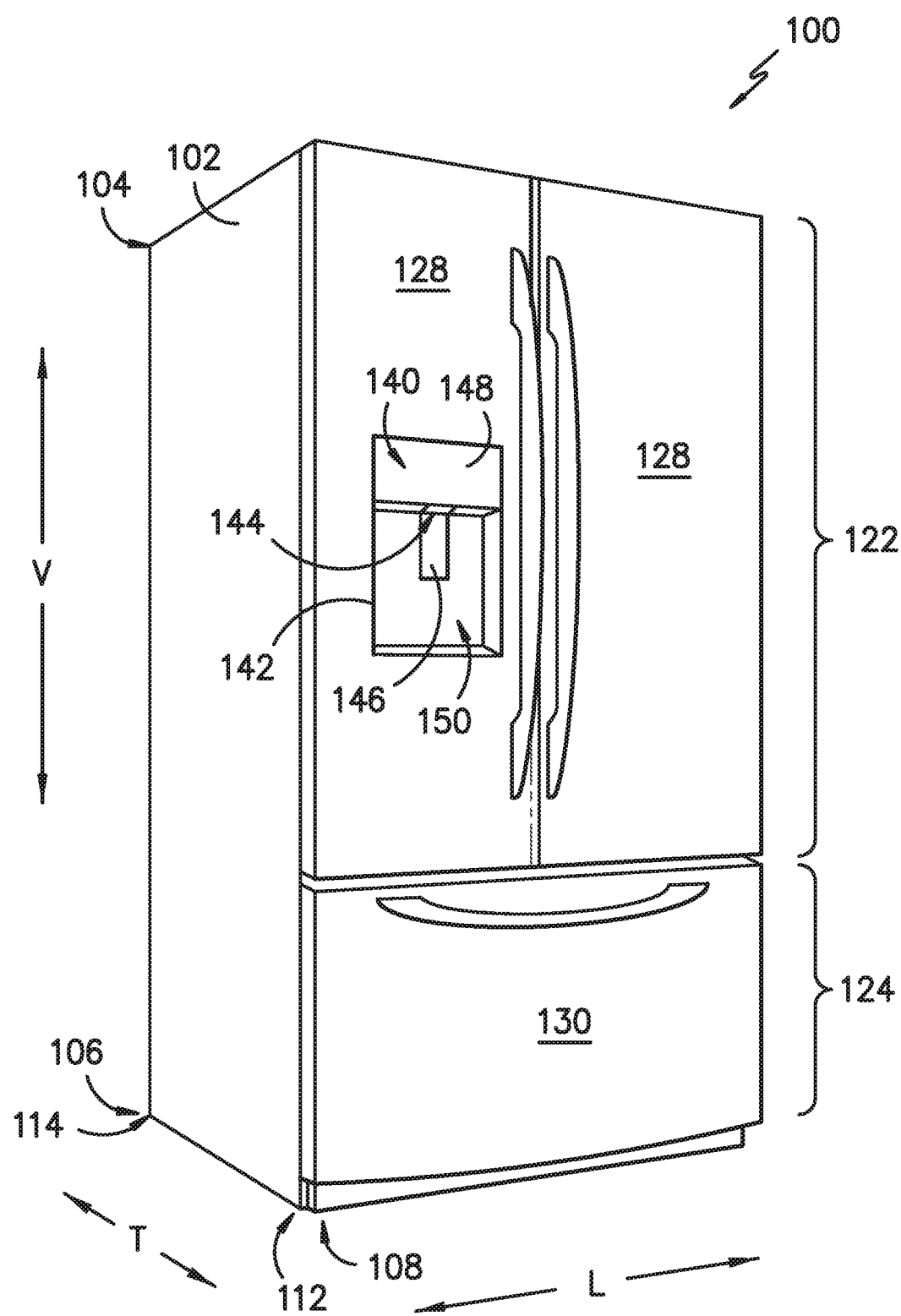
FIG. -1-

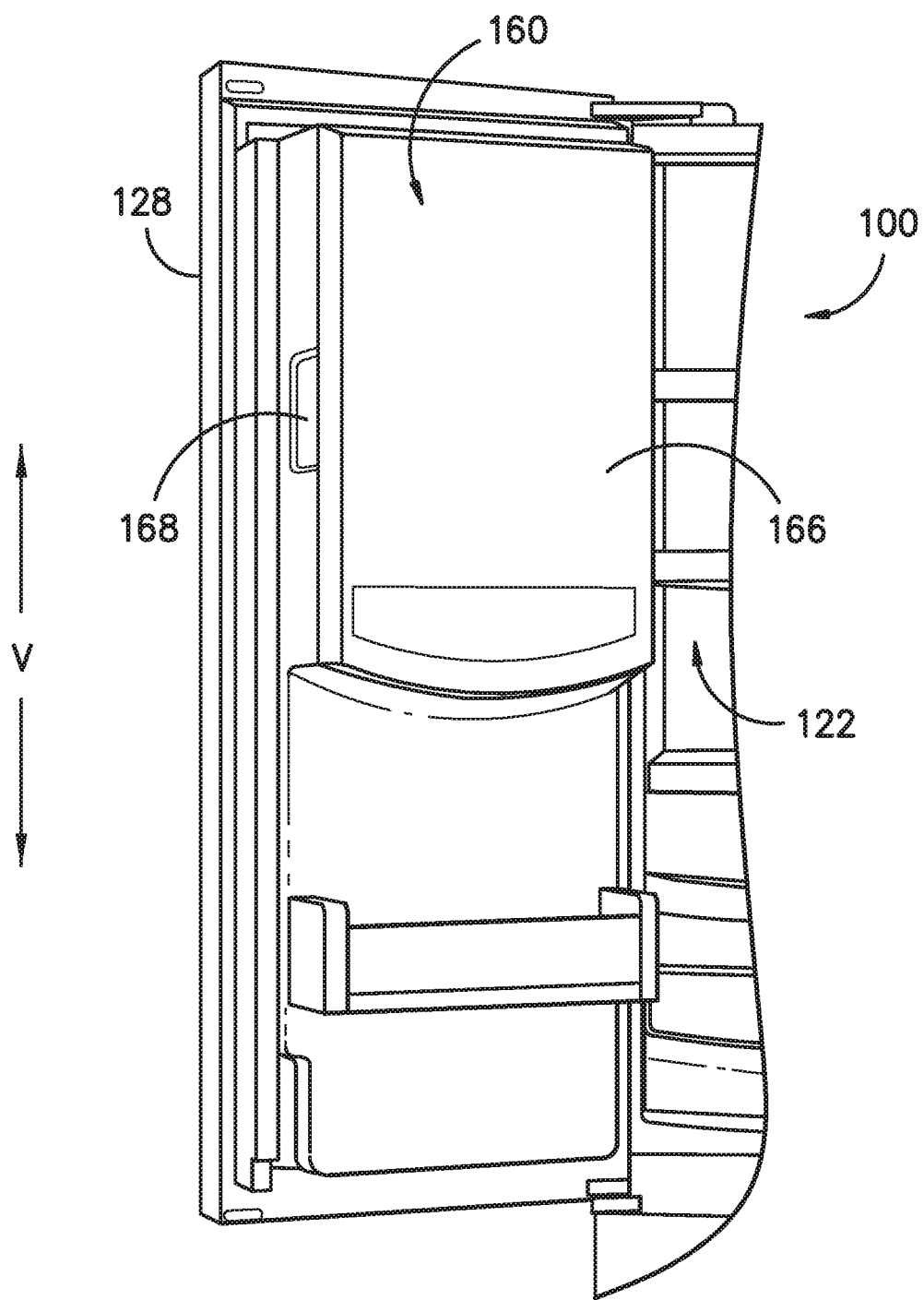
FIG. -2-

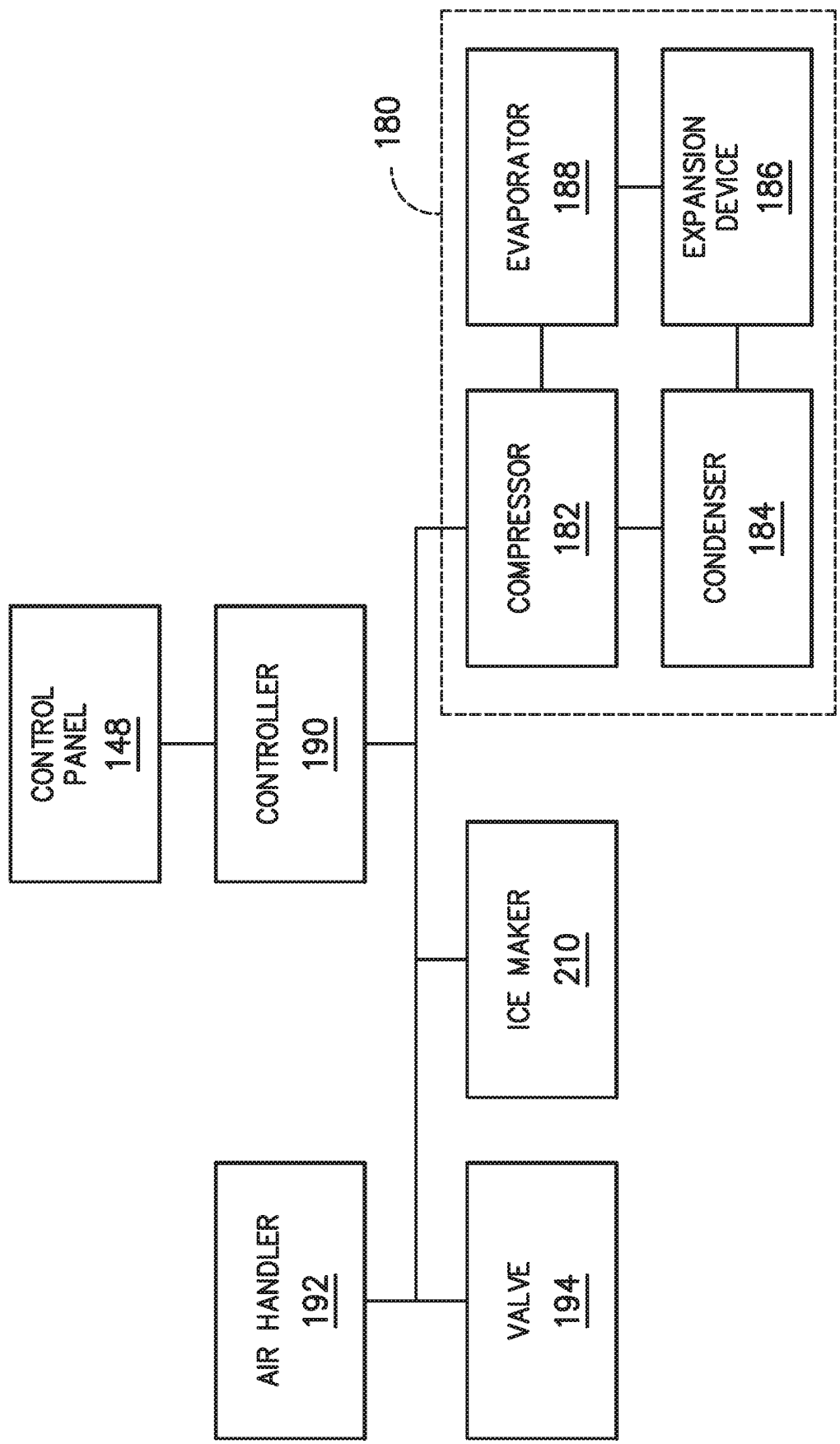
FIG. -3-

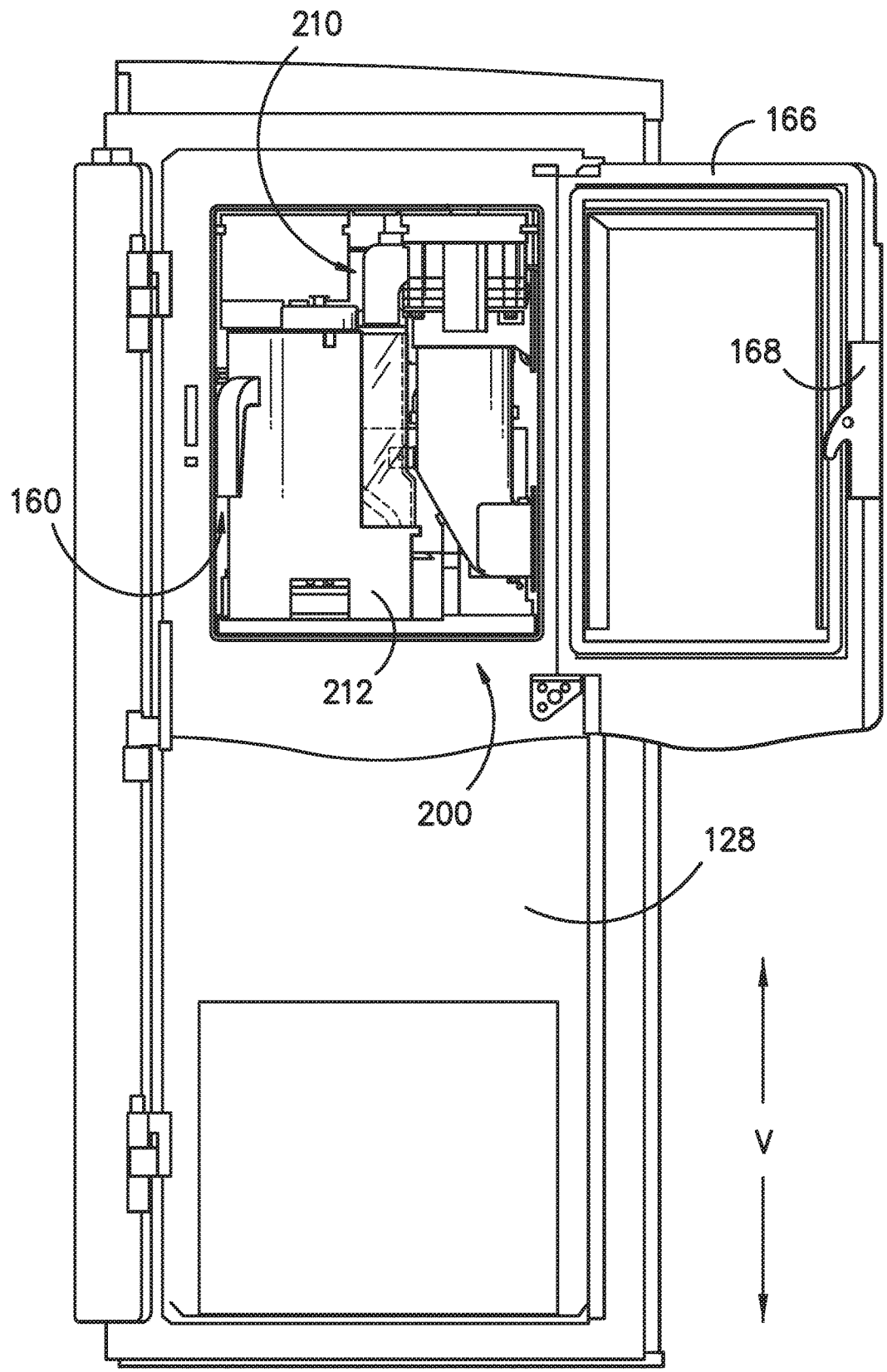
FIG. -4-

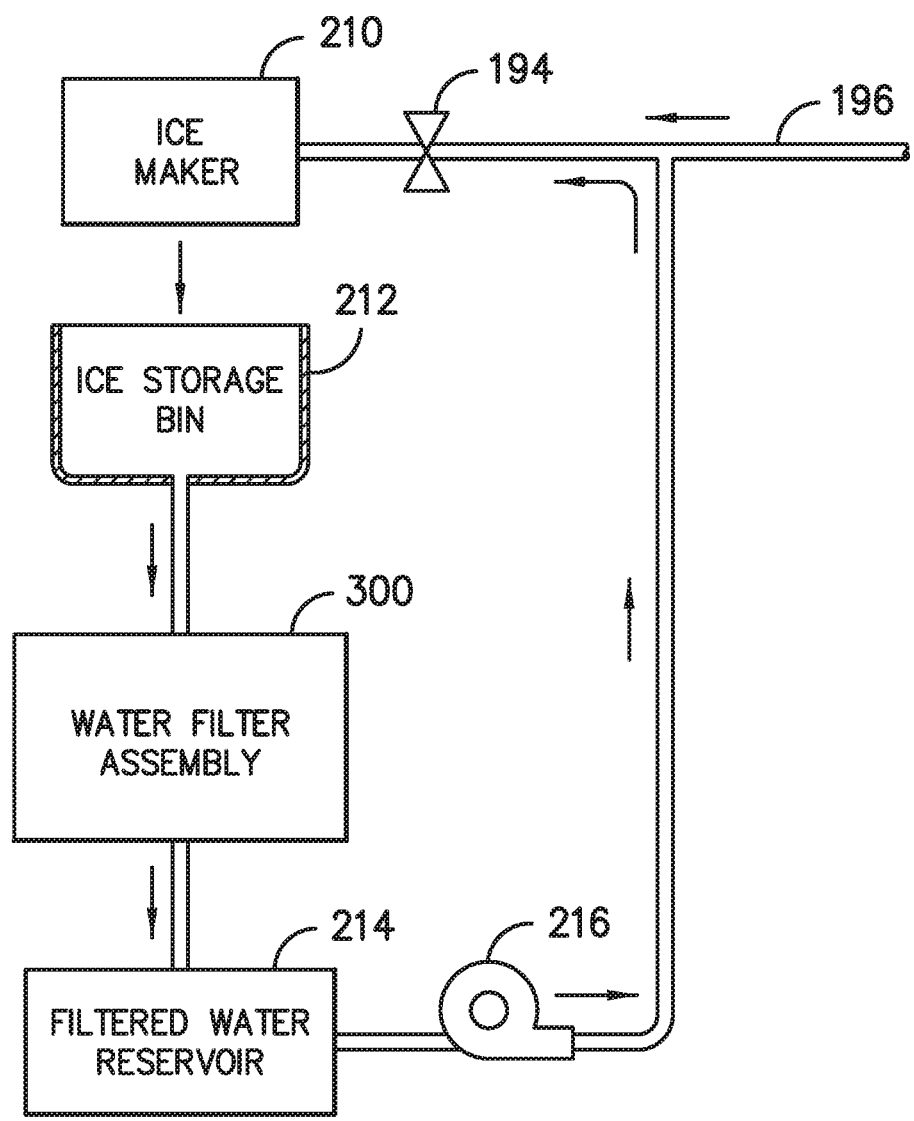
FIG. -5-

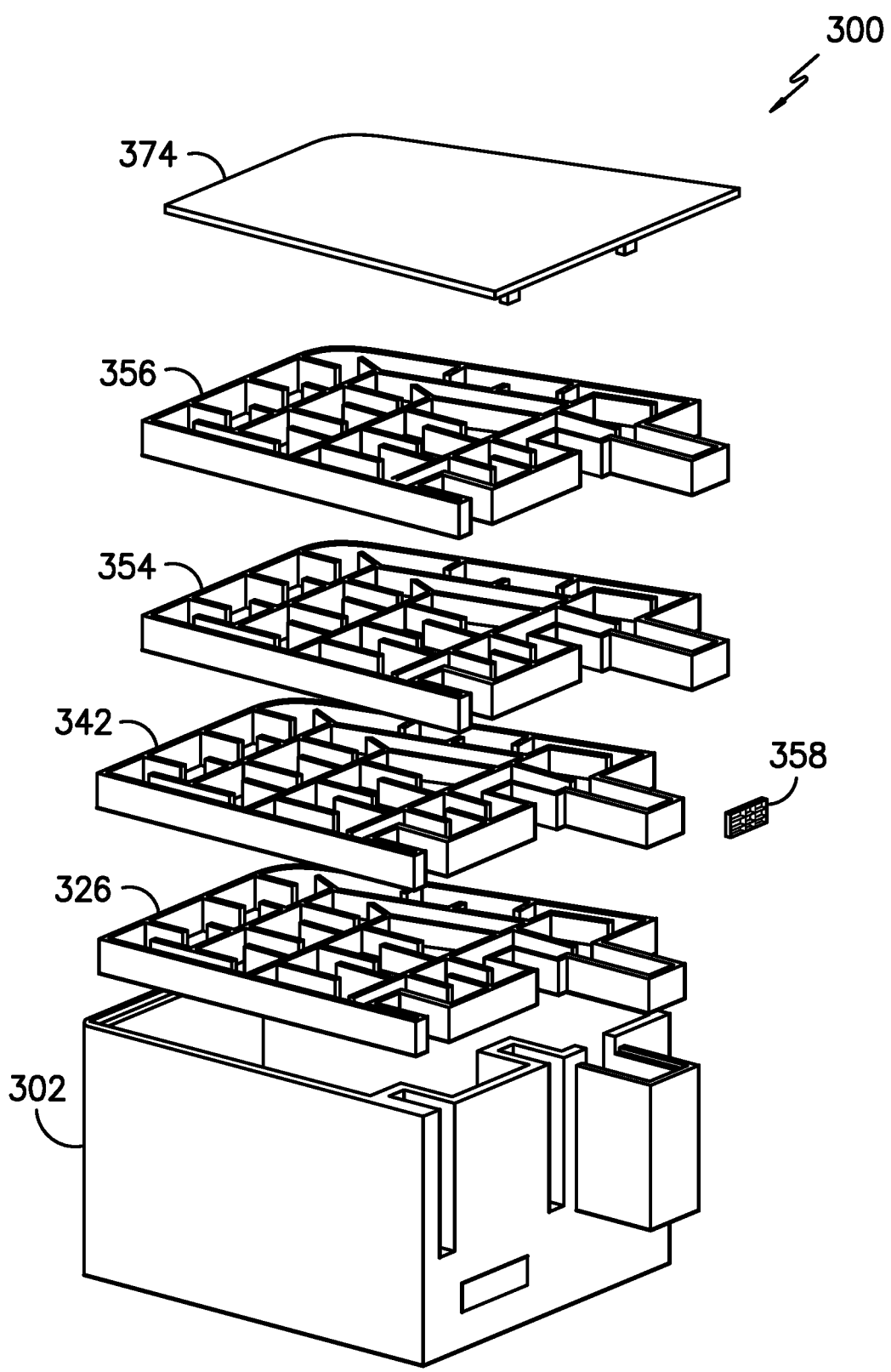
FIG. -6-

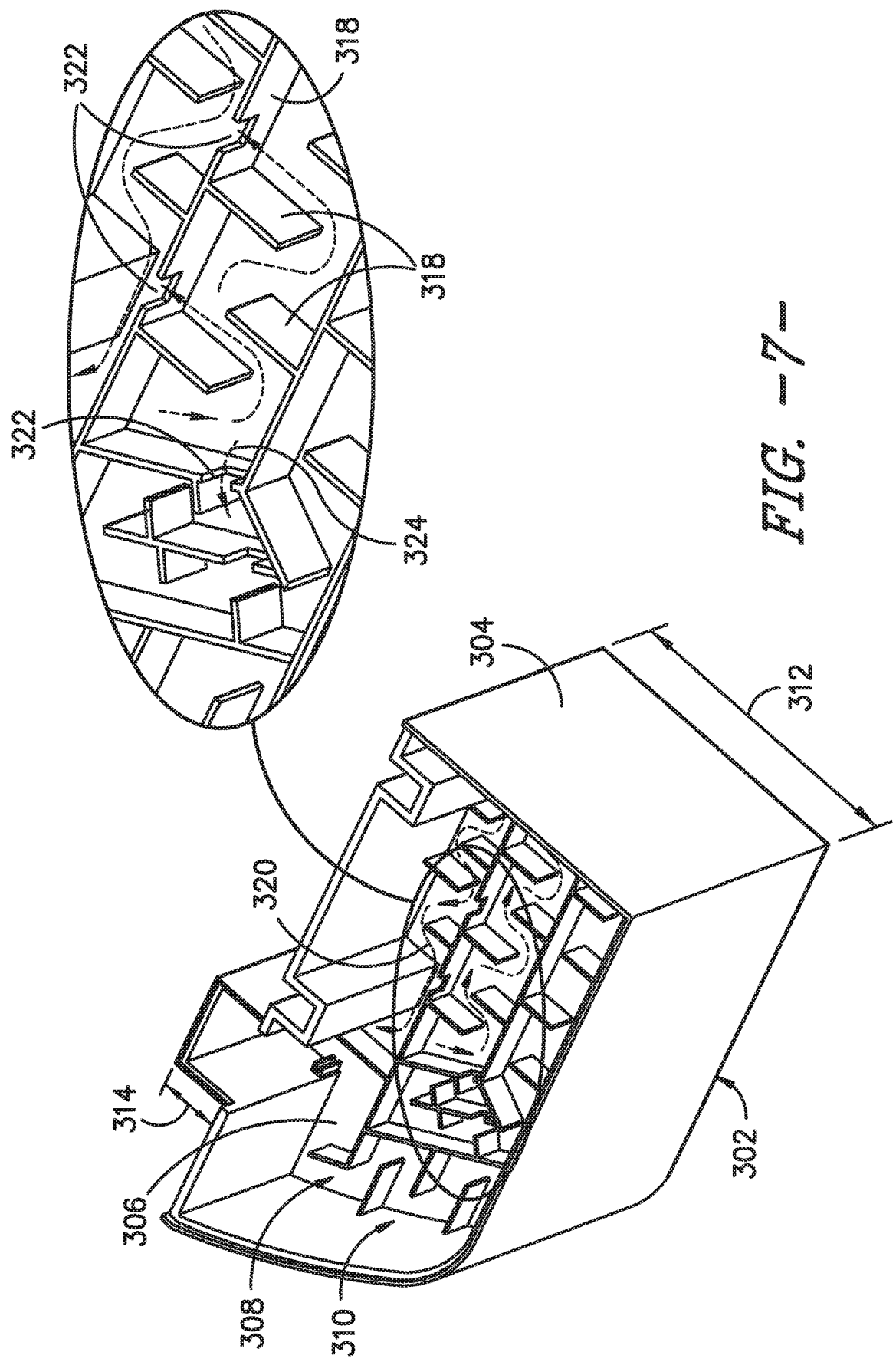
FIG. -7-

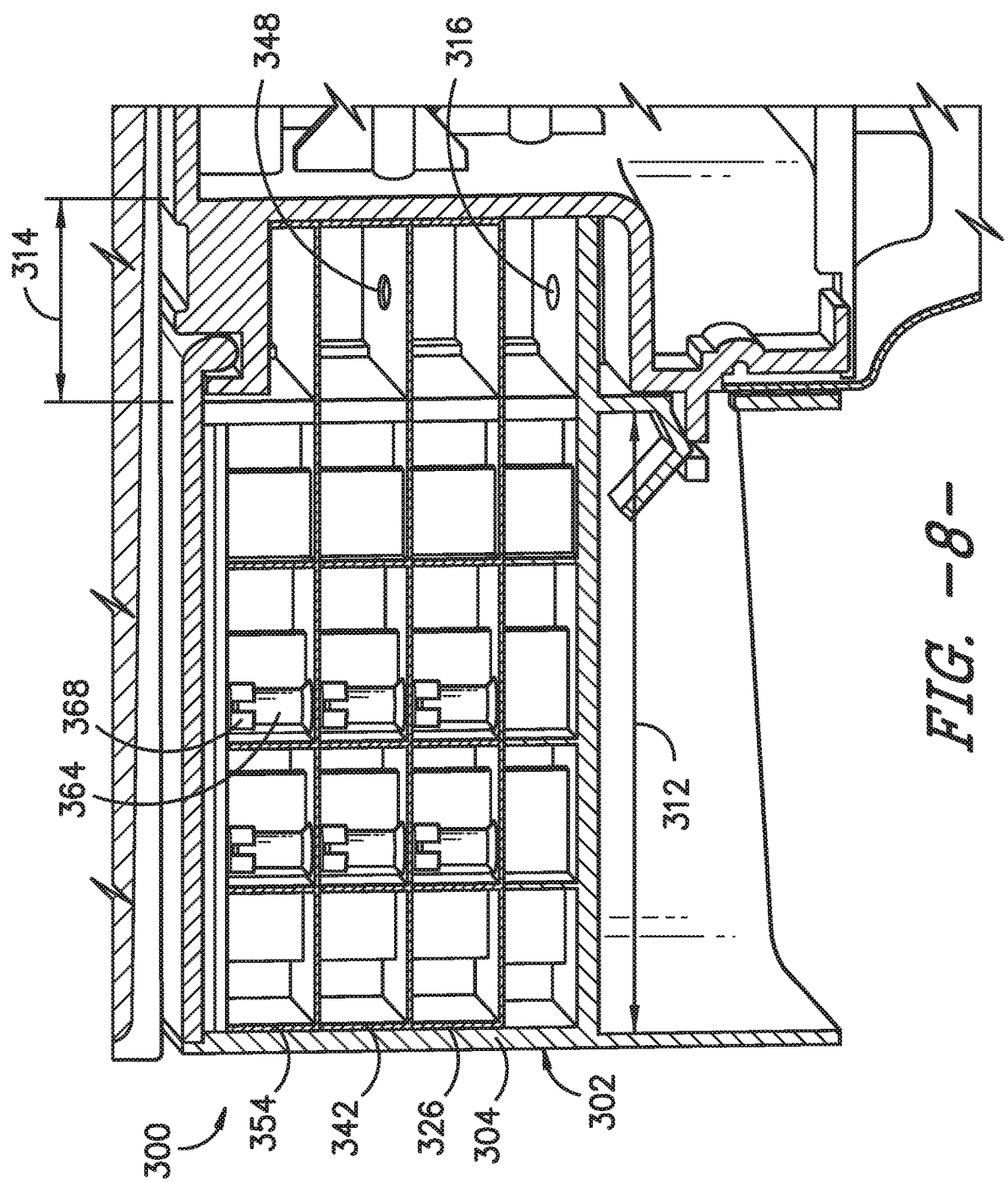
FIG. -8-

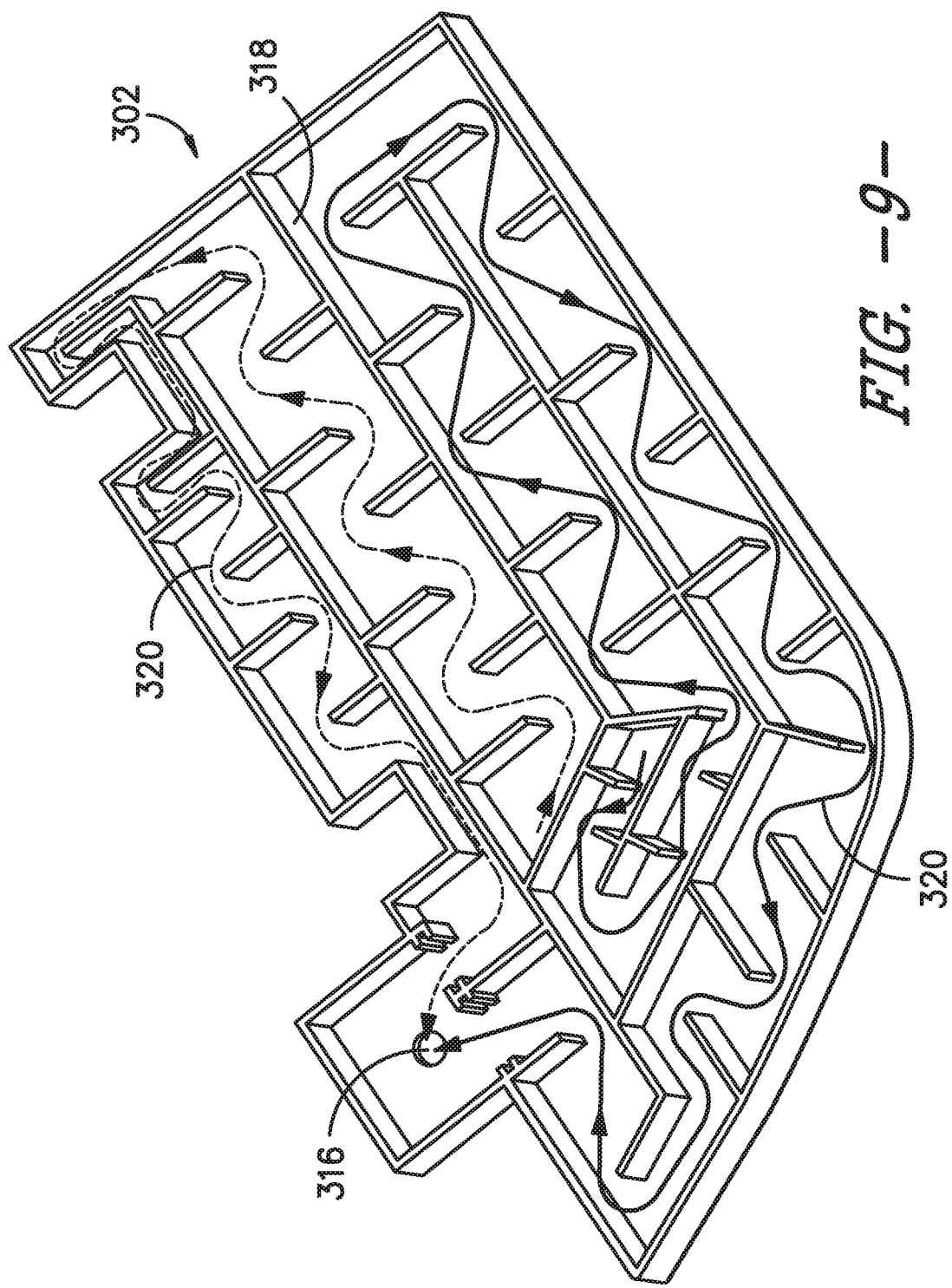

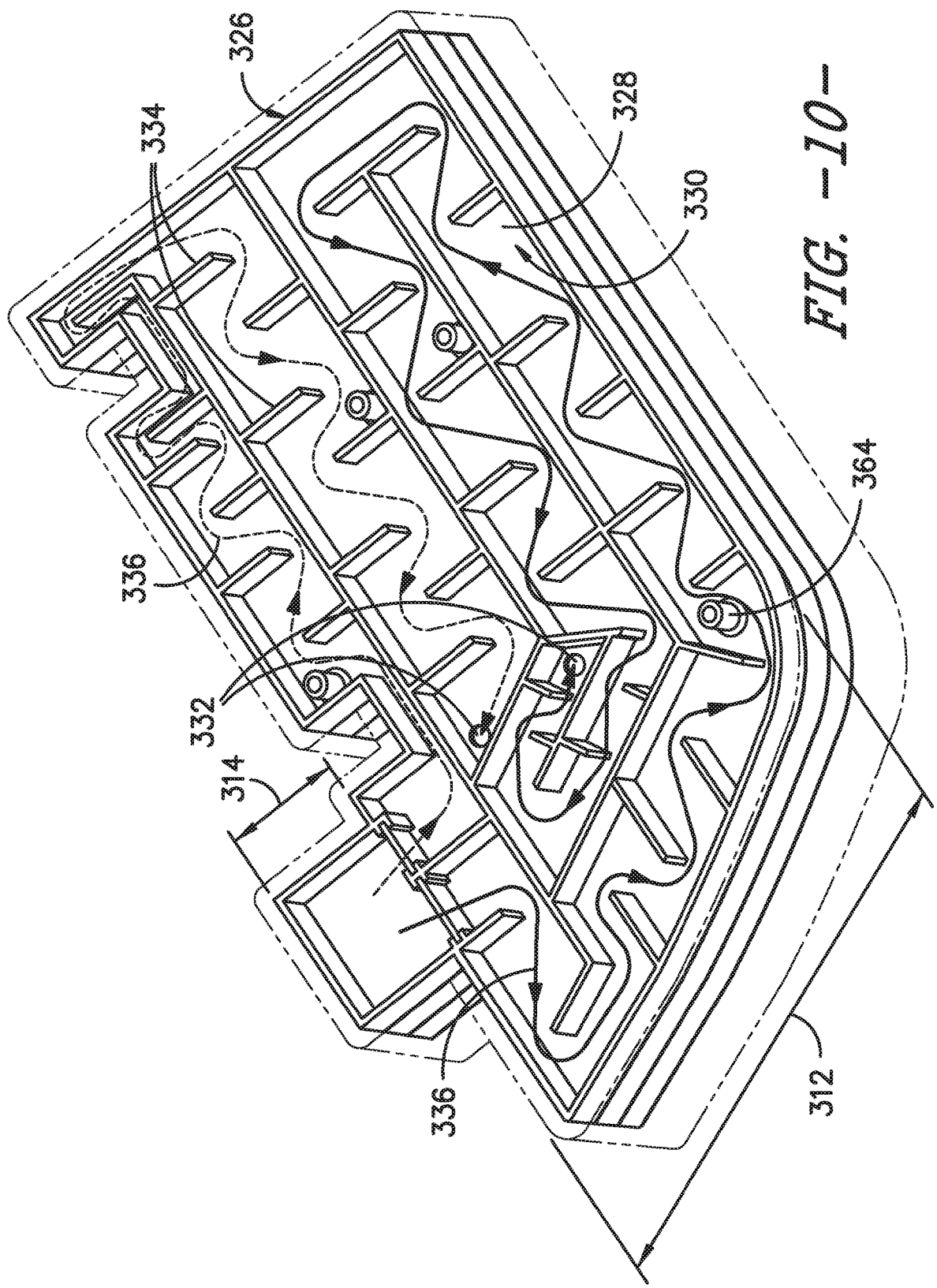

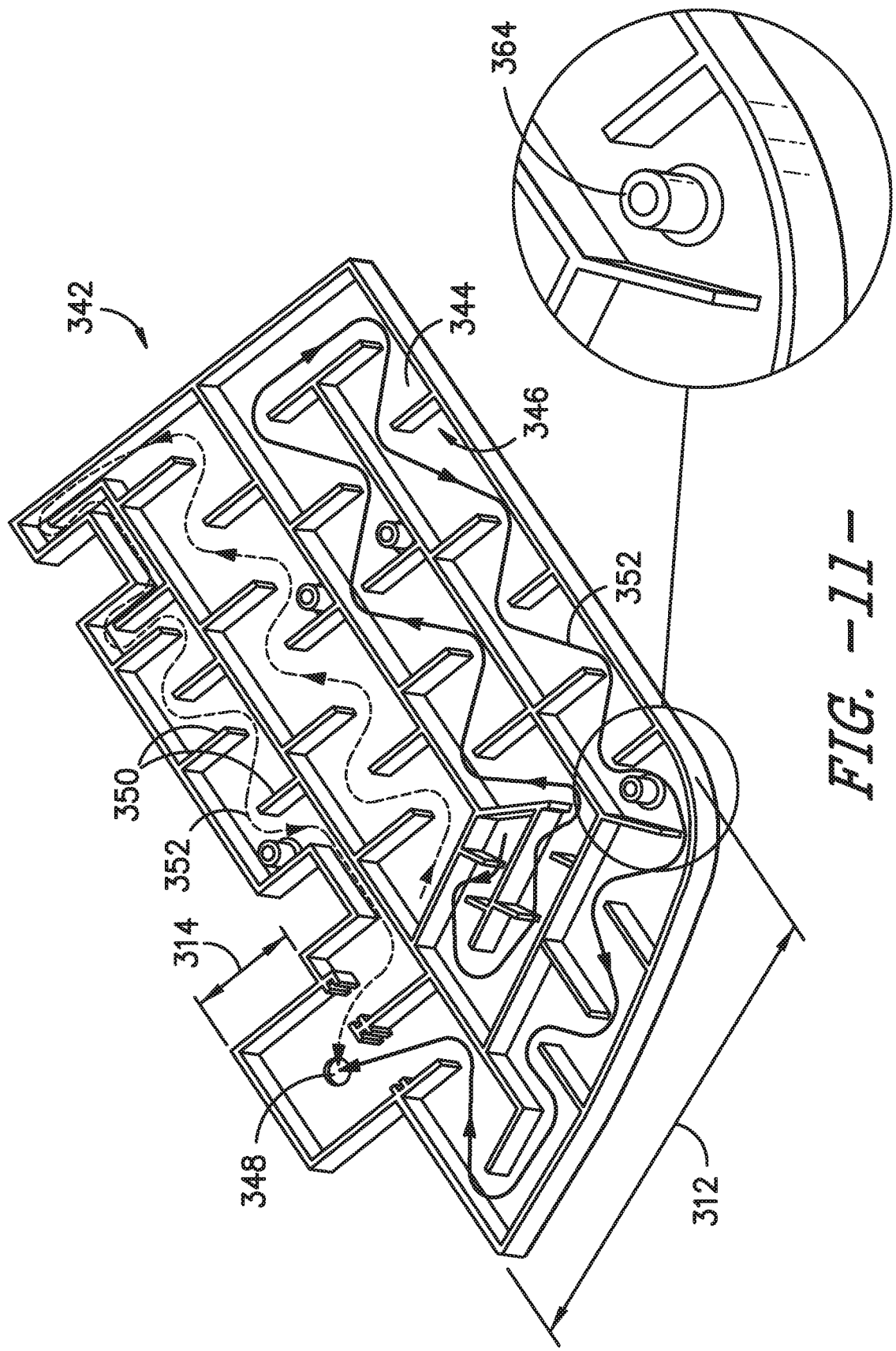

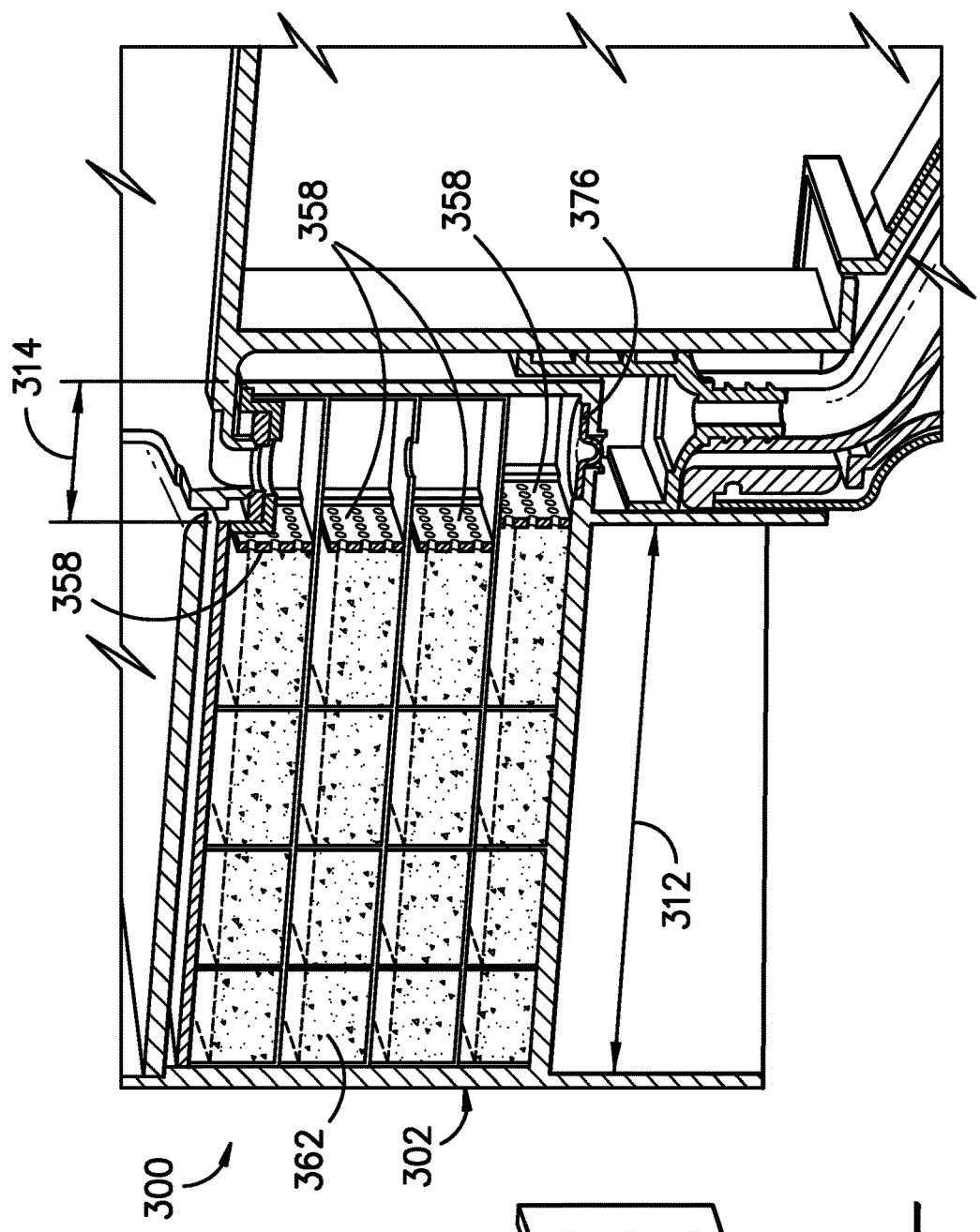
FIG. -12A-
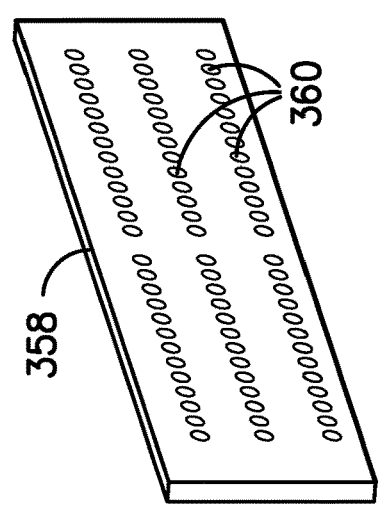
FIG. -12B-

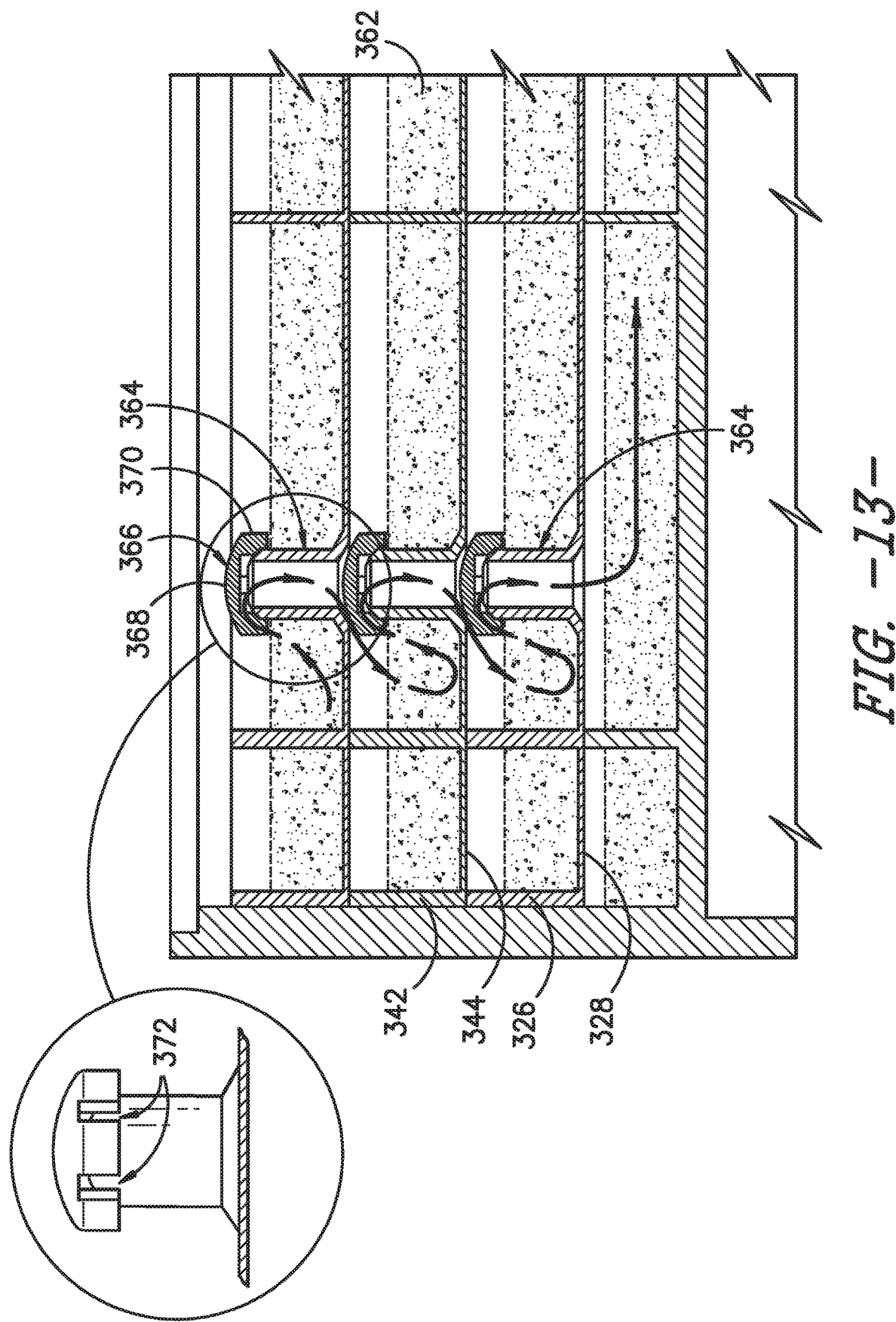

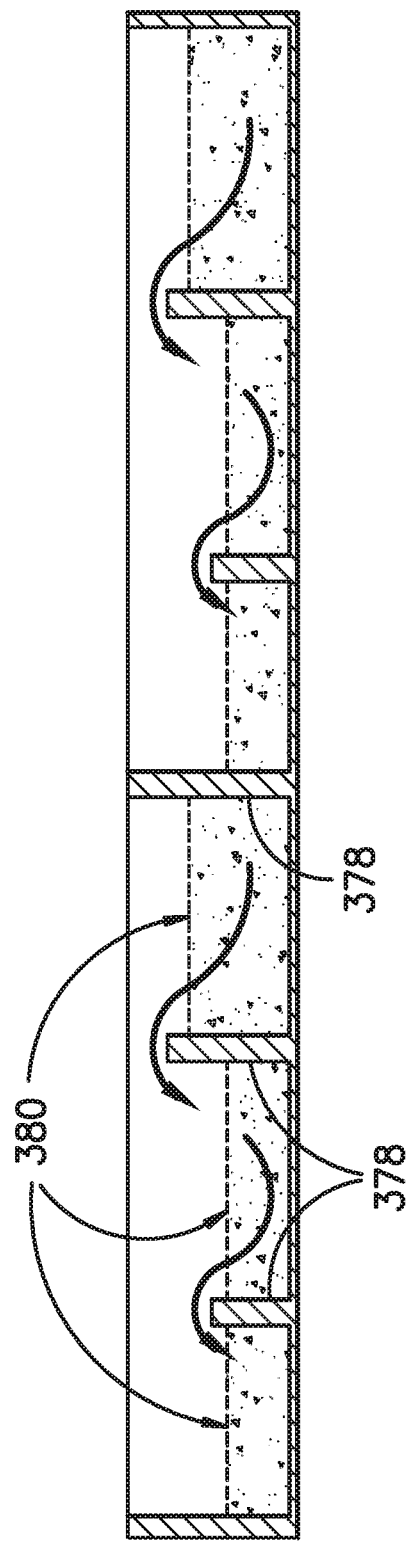

US 11,465,081 B2

WATER FILTERING AND RECYCLING SYSTEM FOR ICE MAKING APPLIANCE

FIELD OF THE INVENTION

The present disclosure relates generally to a water filter assembly and more particularly to a filtration system employing multiple flow paths for preventing blockages.

BACKGROUND OF THE INVENTION

Nugget ice makers are becoming increasingly prevalent. After nugget ice is generated, the nugget ice of such ice makers may generally be held in an ice storage bin and maintained at a temperature below the freezing point of liquid water. As a result, a portion of the ice often melts prior to usage, requiring the generation of additional ice and thus consuming additional water.

To minimize costs associated with these added water usage demands, water from the melted ice may be recycled. However, because this water has previously been held in an ice storage bin, which may accumulate contaminates over time, it is desirable that the water be filtered prior to reuse. Water filters employed for a similar purpose in the past have been prone to blockages that decrease the effectiveness of the filters or prevent their operation altogether. Other filters are limited in effectiveness as a result of insufficient filtration time, for instance, due to limitations on water filter sizes when incorporated into an ice-making appliance.

Thus, a refrigeration appliance or water filter assembly having one or more features for mitigating or minimizing filtration blockages may be desirable. Additionally or alternatively, it may be advantageous to provide a refrigeration appliance or water filter assembly having a compact design that permits adequate filtration and improved efficacy in a relatively small volume.

BRIEF DESCRIPTION OF THE INVENTION

Aspects and advantages of the invention will be set forth in part in the following description, or may be obvious from the description, or may be learned through practice of the invention.

In one aspect of the present disclosure, a water filter assembly is provided. The water filter assembly may include a filter body which may include a vertical side wall, a floor, an outlet hole defined in the floor of the filter body, a plurality of vertical barriers, and a plurality of cutouts. The floor and the vertical side wall together may define a cavity, wherein the cavity is defined along a vertical plane as a filtered cavity portion and an unfiltered cavity portion. The plurality of vertical barriers may further extend from a top side of the floor and may define a plurality of flow paths that converge at the outlet hole. The plurality of cutouts may be defined in an upper portion of the plurality of vertical barriers, each cutout of the plurality of cutouts defining an alternative overflow path permitting water therethrough at a height of the plurality of cutouts.

In another aspect of the present disclosure, a water filter assembly is provided. The water filter assembly may include a filter body and a first filter layer. The filter body may include a vertical side wall, a floor, an outlet hole defined in the floor of the filter body, and a plurality of vertical barriers. The floor and the vertical side wall together may define a cavity, wherein the cavity is defined along a vertical plane as a filtered cavity portion and an unfiltered cavity portion. The plurality of vertical barriers may further extend from a top side of the floor and may define a plurality of flow paths that converge at the outlet hole. The first filter layer may be mounted within the cavity of the filter body, at least a portion of the first filter layer being present within the filtered cavity portion of the filter body and at least a portion of the first filter layer being present within the unfiltered cavity portion of the filter body. The first filter layer may further include a first filter floor having a top side, a plurality of first filter outlet holes, and a plurality of first filter vertical barriers extending from the top side of the first filter floor. The plurality of first filter vertical barriers may further define a plurality of first filter flow paths that all originate from the portion of the first filter layer present within the unfiltered cavity portion, a discrete first filter outlet hole being defined at an end of each first filter flow path.

In yet another aspect of the present disclosure, a refrigerator appliance is provided. The refrigerator appliance may include a cabinet, an insulated chamber mounted within the cabinet, an icemaker mounted within the insulated chamber, and a water filter assembly for filtering water from the icemaker. The water filter assembly may further include a filter body and a first filter layer. The filter body may include a vertical side wall, a floor, an outlet hole defined in the floor of the filter body, and a plurality of vertical barriers. The floor and the vertical side wall together may define a cavity, wherein the cavity is defined along a vertical plane as a filtered cavity portion and an unfiltered cavity portion. The plurality of vertical barriers may further extend from a top side of the floor and may define a plurality of flow paths that converge at the outlet hole. The first filter layer may be mounted within the cavity of the filter body, at least a portion of the first filter layer being present within the filtered cavity portion of the filter body and at least a portion of the first filter layer being present within the unfiltered cavity portion of the filter body. The first filter layer may further include a first filter floor having a top side, a plurality of first filter outlet holes, and a plurality of first filter vertical barriers extending from the top side of the first filter floor. The plurality of first filter vertical barriers may further define a plurality of first filter flow paths that all originate from the portion of the first filter layer present within the unfiltered cavity portion, a discrete first filter outlet hole being defined at an end of each first filter flow path.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a refrigerator appliance according to an exemplary embodiment of the present disclosure.

FIG. 2 provides a cut-away perspective view of the inside of a door of a refrigerator appliance according to an exemplary embodiment of the present disclosure.

FIG. 3 provides a schematic view of certain components of a refrigerator appliance according to an exemplary embodiment of the present disclosure.

FIG. 4 provides a side view of an exemplary ice making assembly with the cabinet of a refrigerator appliance according to an exemplary embodiment of the present disclosure.

FIG. 5 provides a schematic view of an exemplary water recycling process in accordance with an embodiment of the present disclosure.

FIG. 6 provides an exploded perspective view of a water filter assembly according to an exemplary embodiment of the present disclosure.

FIG. 7 provides a perspective view of a filter body according to an exemplary embodiment of the present disclosure.

FIG. 8 provides a cut-away side view of a water filter assembly according to an exemplary embodiment of the present disclosure.

FIG. 9 provides a cross-sectional perspective view of a filter body according to an exemplary embodiment of the present disclosure.

FIG. 10 provides a perspective view of a first filter layer according to an exemplary embodiment of the present disclosure.

FIG. 11 provides a perspective view of a second filter layer according to an exemplary embodiment of the present disclosure.

FIG. 12A provides a cut-away perspective view of a water filter assembly according to an exemplary embodiment of the present disclosure.

FIG. 12B provides a perspective view of a perforated divider according to an exemplary embodiment of the present disclosure.

FIG. 13 provides a cross-sectional side view a water filter assembly with standpipes and a callout of standpipes and standpipe caps according to an exemplary embodiment of the present disclosure.

FIG. 14 provides a cross-sectional side view of pooling compartments according to an exemplary embodiment of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

While the disclosure is described herein in the context of a nugget ice maker within a refrigeration appliance, it should be understood that the water filtration system of this disclosure is not limited to such an application. Rather, the present disclosure may be implemented in any appliance in which filtration and recycling of water is desirable.

Turning to the figures, FIG. 1 illustrates a perspective view of a refrigerator 100. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines one or more insulated chambers 120, such as a fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, for example, a top mount refrigerator appliance or a side-by-side style refrigerator appliance. Consequently, the description set forth herein is for illustrative purposes only and is not intended to be limiting in any aspect to any particular refrigerator chamber configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed position in FIG. 1.

Refrigerator appliance 100 also includes a delivery assembly 140 for delivering or dispensing liquid water or ice. Delivery assembly 140 includes a dispenser 142 positioned on or mounted to an exterior portion of refrigerator appliance 100 (e.g., on one of refrigerator doors 128). Dispenser 142 includes a discharging outlet 144 for accessing ice and liquid water. An actuating mechanism 146, shown as a paddle, is mounted below discharging outlet 144 for operating dispenser 142. In alternative exemplary embodiments, any suitable actuating mechanism may be used to operate dispenser 142. For example, dispenser 142 can include a sensor (such as an ultrasonic sensor) or a button rather than the paddle. A control panel 148 is provided for controlling the mode of operation. For example, control panel 148 includes a plurality of user inputs (not labeled), such as a water dispensing button and an ice-dispensing button, for selecting a desired mode of operation such as crushed or non-crushed ice.

Discharging outlet 144 and actuating mechanism 146 are an external part of dispenser 142 and are mounted in a dispenser recess 150. Dispenser recess 150 is positioned at a predetermined elevation convenient for a user to access ice or water and enabling the user to access ice without the need to bend-over and without the need to open refrigerator doors 128. In the exemplary embodiment, dispenser recess 150 is positioned at a level that approximates the chest level of a user. As described in more detail below, the dispensing assembly 140 may receive ice from an icemaker disposed in a sub-compartment of the fresh food chamber 122.

FIG. 2 provides a perspective view of a door of refrigerator doors 128. As shown, optional embodiments of refrigerator appliance 100 include a sub-compartment 160 defined on refrigerator door 128. Sub-compartment 160 is often referred to as an "icebox." Moreover, sub-compartment 160 extends into fresh food chamber 122 when refrigerator door 128 is in the closed position.

FIG. 3 provides a schematic view of certain components of refrigerator appliance 100. As may be seen in FIG. 3, refrigerator appliance 100 includes a sealed cooling system 180 for executing a vapor compression cycle for cooling air within refrigerator appliance 100 (e.g., within fresh food chamber 122 and freezer chamber 124). Sealed cooling system 180 includes a compressor 182, a condenser 184, an expansion device 186, and an evaporator 188 connected in fluid series and charged with a refrigerant. As will be understood by those skilled in the art, sealed cooling system 180 may include additional components (e.g., at least one additional evaporator, compressor, expansion device, or condenser). As an example, sealed cooling system 180 may include two evaporators.

Within sealed cooling system 180, gaseous refrigerant flows into compressor 182, which operates to increase the pressure of the refrigerant. This compression of the refrigerant raises its temperature, which is lowered by passing the gaseous refrigerant through condenser 184. Within condenser 184, heat exchange with ambient air takes place so as to cool the refrigerant and cause the refrigerant to condense to a liquid state.

Expansion device 186 (e.g., a valve, capillary tube, or other restriction device) receives liquid refrigerant from condenser 184. From expansion device 186, the liquid refrigerant enters evaporator 188. Upon exiting expansion device 186 and entering evaporator 188, the liquid refrigerant drops in pressure and vaporizes. Due to the pressure drop and phase change of the refrigerant, evaporator 188 is cool relative to fresh food and freezer chambers 122 and 124 of refrigerator appliance 100. As such, cooled air is produced and refrigerates fresh food and freezer chambers 122 and 124 of refrigerator appliance 100. Thus, evaporator 188 is a heat exchanger which transfers heat from air passing over evaporator 188 to refrigerant flowing through evaporator 188.

Optionally, refrigerator appliance 100 further includes a valve 194 (e.g., in fluid communication with a water supply line 196—FIG. 5) for regulating a flow of liquid water to an icemaker 210. Valve 194 is selectively adjustable between an open configuration and a closed configuration. In the open configuration, valve 194 permits a flow of liquid water to icemaker 210. Conversely, in the closed configuration, valve 194 hinders the flow of liquid water to icemaker 210.

In some embodiments, refrigerator appliance 100 also includes an air handler 192. Air handler 192 may be operable to urge a flow of chilled air from an evaporator (FIG. 3) (e.g., within a freezer chamber 124) into icebox compartment 160 (e.g., via supply and return ducts or chilled air passages) and may be any suitable device for moving air. For example, air handler 192 can be an axial fan or a centrifugal fan.

Operation of the refrigerator appliance 100 can be regulated by a controller 190 that is operably coupled to (e.g., in electrical or wireless communication with) user interface panel 148, sealed cooling system 180, or various other components. User interface panel 148 provides selections for user manipulation of the operation of refrigerator appliance 100, such as dispensing ice, chilled water, or other various options. In response to user manipulation of user interface panel 148 or one or more sensor signals, controller 190 may operate various components of the refrigerator appliance 100. Controller 190 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 190 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

Controller 190 may be positioned in a variety of locations throughout refrigerator appliance 100. In the illustrated embodiment, controller 190 is located within the user interface panel 148. In other embodiments, controller 190 may be positioned at any suitable location within refrigerator appliance 100, such as for example within a fresh food chamber, a freezer door, etc. Input/output ("I/O") signals may be routed between controller 190 and various operational components of refrigerator appliance 100. For example, user interface panel 148 may be in communication with controller 190 via one or more signal lines or shared communication buses.

As illustrated, controller 190 may be in communication with the various components of dispensing assembly 140 and may control operation of the various components. For example, the various valves, switches, etc. may be actuatable based on commands from controller 190. As discussed, interface panel 148 may additionally be in communication with controller 190. Thus, the various operations may occur based on user input or automatically through controller 190 instruction.

As may be seen in FIG. 4, an ice making assembly 200, including an icemaker 210 and an ice storage bin 212 attached to cabinet 102 (FIG. 1) (e.g., indirectly via a door 128 or, alternatively, directly within a chilled chamber thereof). In optional embodiments, ice making assembly 200 is positioned or disposed within icebox compartment 160. Alternatively, ice making assembly 200 may be directly mounted within a chilled chamber (e.g., freezer chamber 124—FIG. 1) of refrigerator appliance 100, as would be understood.

In optional embodiments, an access door 166 is hinged to refrigerator door 128. Generally, access door 166 may permit selective access to icebox compartment 160. Any manner of suitable latch 168 is configured with icebox compartment 160 to maintain access door 166 in a closed position. As an example, latch 168 may be actuated by a consumer in order to open access door 166 for providing access into icebox compartment 160. Access door 166 can also assist with insulating icebox compartment 160.

It is noted that although ice making assembly 200 is illustrated as being at least partially enclosed within icebox compartment 160, alternative embodiments may be free of any separate access door 166 (e.g., such that ice making assembly 200 is generally in open fluid communication with at least one chilled chamber of refrigerator appliance 100).

In some embodiments, ice can be selectively supplied to dispenser recess 150 (FIG. 1) from icemaker 210 or ice storage bin 212 in icebox compartment 160 on a back side of refrigerator door 128. In additional or alternative embodiments, air from a sealed system 180 (FIG. 3) of refrigerator appliance 100 may be directed into icemaker 210 in order to cool icemaker 210. As an example, during operation of icemaker 210, chilled air from the sealed system 180 may cool components of icemaker 210, such as a casing or mold body of icemaker 210, to or below a freezing temperature of liquid water. Thus, icemaker 210 may be an air cooled icemaker. Chilled air from the sealed system 180 may also cool ice storage bin 212. In particular, air around ice storage bin 212 can be chilled to a temperature above the freezing temperature of liquid water (e.g., to about the temperature of fresh food chamber 122, such that ice nuggets in ice storage bin 212 melt over time due to being exposed to air having a temperature above the freezing temperature of liquid water).

As a result of the melting of ice nuggets within ice storage bin 212, icemaker 210 may require frequent operation to generate additional ice to replace the melted ice nuggets. In order to limit the amount of water usage resulting from this operation, it may be desirable to recycle the water derived from the melted ice nuggets. However, this can be complicated by the fact that the melted water within ice storage bin 212 may collect particulates that accumulate in ice storage bin 212 over time. Therefore, it may be desirable that water to be recycled is filtered prior to reuse.

In embodiments in which the temperature is chilled above the freezing temperature of liquid water, ice storage bin 212 includes a drain for removal of water resulting from melting ice nuggets. As shown in FIG. 5, in some embodiments, the drain within ice storage bin 212 is in fluid communication with a water filter assembly 300, delivering the water to water filter assembly 300 for at least partial removal of contaminates in the water. Water filter assembly 300 is in fluid communication with a filtered water reservoir 214, where filtered water may be temporarily stored. Filtered water reservoir 214 may be connected to a water pump 216. Water pump 216 may be designed to operate periodically at a fixed time interval or, alternatively, based on the volume of filtered water collected within filtered water reservoir 214. Regardless of the mechanism for triggering its operation, water pump 216 may pump filtered water from filtered water reservoir 214 back to water supply line 196, which supplies water to icemaker 210, completing the recycling loop.

The water filter assembly 300 is now discussed in greater detail. In FIG. 6, an exploded perspective view of an exemplary embodiment of water filter assembly 300 is shown. Water filter assembly 300 comprises a filter body 302, a first filter layer 326, a second filter layer 342, a third filter layer 354, a fourth filter layer 356, and a filter body cap 374. While this embodiment of water filter assembly includes four layers of filtering, in addition to the filtering capacity of filter body 302 (as further explained herein), the present disclosure is not dependent on the number of filtering layers. Thus, optional embodiments include greater or fewer filtering layers (e.g., a first filter layer 326, a first filter layer 326 and a second filter layer 342, more than four filter layers, etc.).

In some embodiments, filtration media 362 (FIG. 12A) reside within portions of each filter layer 326, 342, 354, and 356, as well as within a portion of filter body 302 to treat contaminates from water traveling through filtration media 362. Thus, it is generally desirable to maximize the time that the water being filtered is exposed to filtration media 362. This may be accomplished, in part, by increasing the number of filtering layers used in water filter assembly 300. However, this design consideration must be balanced against the practical reality of space constraints within the refrigerator 100 (FIG. 1) or other appliances. In certain embodiments, four filter layers may be appropriate, such as shown in the exemplary embodiment of FIG. 6. The type of filtration media 362 is not intended to be limiting. Rather, resin or other suitable absorption-based filtration media 362 may be appropriate.

FIGS. 7 and 8 illustrate exemplary embodiments of filter body 302. Filter body 302 may provide a housing for all of the elements of water filter assembly 300 (e.g., with the exception of filter body cap 374). As shown in the embodiment of FIG. 7, filter body 302 includes one or more vertical side walls 304 extending upward from a floor 306 and around the perimeter of filter body 302. The vertical side walls 304 and floor 306 together define (e.g., at least in part) a cavity 310 within which many of the components of filter assembly 300 may be contained. Cavity 310 may be defined along a vertical plane as a filtered cavity portion 312, wherein filtration media 362 resides (FIG. 12A) for filtering water that passes therethrough, and an unfiltered cavity portion 314, wherein no such filtration media 362 is present.

In operation of water filter assembly 300, water from melted ice in ice storage bin 212 may be introduced to water filter assembly 300 via unfiltered cavity portion 314 and then directed to filtered cavity portion 312. Therefore, in some embodiments, such as shown in the embodiments of FIGS. 7 and 8, unfiltered cavity portion 314 is extended further (e.g., along a horizontal direction, such as transverse direction T or lateral direction L) from a vertical geometric center plane of filter body 302 than is filtered cavity portion 312 to facilitate delivery of the water. In some such embodiments, filter body cap 374 is connected to a top of vertical side walls 304 and covers only the filtered cavity portion 312 of filter body 302. Thus filter body cap 374 may contain filtration media 362 within water filter assembly 300, prevent unintended introduction of particulates into filtered cavity portion 312 of filter body 302, or allow for transmission of water from ice storage bin 212 to unfiltered cavity portion 314 of filter body 302. In other embodiments, however, unfiltered cavity portion 314 need not be extended any more than filtered cavity portion 312, in which case filter body cap 374 may be connected to a top of vertical side walls 304 and define an opening over unfiltered cavity portion 314 to accommodate the introduction of water into filter body 302.

As shown in FIG. 8, an exemplary embodiment of filter body 302 further includes an outlet hole 316 defined in floor 306 of filter body 302. Outlet hole 316 may be the point of exit for water traveling through water filter assembly 300. Outlet hole 316 may be located within the unfiltered cavity portion 314 of filter body 302 in order to prevent filtration media 362 from clogging the outlet hole 316 and to further ensure that filtration media 362 remains within water filter assembly 300.

Some embodiments further include a fluid outlet valve 376 attached to floor 306 of filter body 302 and, for example, covering outlet hole 316 (FIG. 12A). In certain embodiments, fluid outlet valve 376 is made of a rubber or other elastomeric material and comprises a pocket, at the bottom of which is a four-lipped cross-cut valve. In some such embodiments, water collects within the pocket and the weight of the water accumulation opens the valve 376, allowing water to drip through. The valve 376 may create a film over the cross-cut opening to prevent air from entering through the opening. The fluid outlet valve 376 is not limited to this embodiment, however, and valve 376 may be any suitable valve for permitting the flow of water and sealing the water filter assembly 300 from outside air.

The filter body 302 may further include a plurality of vertical barriers 318 extending from a top side 308 of floor 306. Vertical barriers 318 may define a plurality of flow paths 320 that the water may travel through within filter body 302. In some embodiments, such as those illustrated in FIG. 9, vertical barriers 318 may create a labyrinth or maze-like structure defining two flow paths 320 through which water may travel. As shown in FIG. 9, these two flow paths 320 may be separated from one another until they converge at outlet hole 316 of filter body 302. Advantageously, having multiple flow paths significantly reduces the likelihood that water filter assembly 300 will become clogged, as even if one flow path 320 does clog, water filter assembly 300 may continue to operate using another flow path 320.

Vertical barriers 318 may further include a plurality of cutouts 322 defined in an upper portion of vertical barriers 318 (FIG. 7). Each of the plurality of cutouts 322 may define an alternative flow path 324 permitting water therethrough at the height of the cutouts 322. Thus, if a portion of flow path 320 becomes blocked or if filters layers (e.g., one or more of layers 326, 342, 354, or 356) are misaligned, water may collect until it reaches the height of cutouts 322 and spill over cutouts 322 in vertical barriers 318 via alternative flow path 324 to bypass the blockage (e.g., either further along the same flow path 320 or along a separate flow path 320, depending on the location of the blockage and cutouts 322).

Water filter assembly 300 may further include a first filter layer 326. First filter layer 326 may be mounted within cavity 310 of filter body 302 and may rest atop vertical barriers 318 of filter body 302 (FIG. 8). In certain embodiments, such as the exemplary embodiment shown in FIG. 8, at least a portion of first filter layer 326 is present within filtered cavity portion 312 of filter body 302. Additionally or alternatively, at least a portion of first filter layer 326 is present within unfiltered cavity portion 314 of filter body 302. First filter layer 326 may further include a first filter floor 328 having a top side 330, a plurality of first filter outlet holes 332, and a plurality of first filter vertical barriers 334 (e.g., as show in FIG. 10, showing a perspective view of an embodiment of first filter layer 326).

First filter vertical barriers 334 may extend from top side 330 of first filter floor 328 and define a plurality of first filter flow paths 336. The embodiment of FIG. 10 illustrates an embodiment in which first filter vertical barriers 334 define two first filter flow paths 336. As shown in FIG. 10, each of the first filter flow paths 336 originate from the portion of first filter layer 326 present within unfiltered cavity portion 314 of filter body 302. Additionally, each first filter flow path 336 may have an end 340, where first filter vertical barriers 334 provide no additional path for the flow of water (i.e., a dead end). Discrete first filter outlet holes 332 may be defined at each end 340 of each first filter flow path 336 to permit water to drop to the floor 306 of the filter body 302 below it.

Water filter assembly 300 may further include a second filter layer 342. Second filter layer 342 may be mounted within cavity 310 of filter body 302. In some embodiments, second filter layer 342 rests atop first filter layer 326 (FIG. 8). In certain embodiments, such as the exemplary embodiment shown in FIG. 8, at least a portion of second filter layer 342 is present within filtered cavity portion 312 of filter body 302. In additional or alternative embodiments, at least a portion of second filter layer 342 is present within unfiltered cavity portion 314 of filter body 302. Second filter layer 342 may further include a second filter floor 344 having a top side 346, a second filter outlet hole 348, and a plurality of second filter vertical barriers 350 (e.g., as shown in FIG. 11, showing a perspective view of an embodiment of second filter layer 342).

Second filter vertical barriers 350 may extend from top side 346 of second filter floor 344 and define a plurality of second filter flow paths 352. The embodiment of FIG. 11 illustrates an embodiment in which second filter vertical barriers 350 define two second filter flow paths 350. As shown in FIG. 11, each of the second filter flow paths 352 originate from the portion of second filter layer 342 present within filtered cavity portion 312 of filter body 302 and maintain a separation until they converge at second filter outlet hole 348, where water is permitted to drop to the first filter floor 328 of first filter layer 326 below it.

As shown in FIGS. 10 and 11, the plurality of first filter vertical barriers 334 and the plurality of second filter vertical barriers 350 may be identical in quantity and arrangement. Nonetheless, differences may exist in the location of first filter outlet holes 338 and second filter outlet hole 348, the direction of their respective first filter and second filter flow paths 336 and 352, or the order in which filter outlet holes 338 and second filter outlet hole 348 are stacked within filter body 302 (e.g., along the vertical direction). The commonalities between first filter vertical barriers 334 and second filter vertical barriers 350 may advantageously decreases the cost of production since a single mold may be used to create both the first filter layer 326 and the second filter layer 342. This common structure may also be employed with regard to third filter layer 354 and fourth filter layer 356, which are addressed below, or any other filter layer that may be included within filter body 302.

In certain embodiments, water filter assembly 300 may further include a third filter layer 354 mounted within filter body 302. In some embodiments, third filter layer 354 rests atop second filter layer 342 (FIG. 6). Third filter layer 354 may be structurally identical to first filter layer 326 in all material respects.

Optionally, water filter assembly 300 may further include a fourth filter layer 356 mounted within filter body 302 (e.g., resting atop third filter layer 354—FIG. 6). Fourth filter layer 356 may be structurally identical to second filter layer 342 in all material respects.

While the embodiment of water filter assembly 300 in FIG. 6 includes four filter layers, it should be understood that any suitable number of layers may be employed. Where additional filter layers are desirable, one of ordinary skill will recognize that structurally identical copies of first filter layer 326 and second filter layer 342 could be stacked alternately atop one another within filter body 302. It should be further noted that, by employing this alternating pattern, the position of the outlet holes on a given filter layer corresponds to the starting point of the flow path on the filter layer below it (compare FIGS. 9 and 10), thus enabling the water being filtered to snake back and forth as it travels downward from layer to layer.

Referring now to FIG. 11, water filter assembly 300 may optionally include one or more perforated dividers 358. Each perforated divider may define a plurality of perforations 360 sized to permit the passage of water therethrough while preventing passage of filtration media 362 therethrough. A perforated divider 358 may be mounted on floor 306 of filter body 302; another perforated divider 358 may be mounted on first filter floor 328 of first filter layer 326; yet another perforated divider 358 may be mounted on second filter floor 344 of second filter layer 342; and so on, with a perforated divider 358 on each filter layer. Further, as shown in the embodiment of FIG. 11, for each perforated divider 358, it is mounted between filtered cavity portion 312 of filter body 302 and unfiltered cavity portion 314 of filter body 302, thus preventing filtration media 362 contained, on any given layer, within the filtered cavity portion 312 of filter body 302 from passing into the unfiltered cavity portion 314 of filter body 302, while permitting the flow of water to continue.

In some embodiments, water filter assembly 300 includes a plurality of standpipes 364 on each filter layer, as shown in FIGS. 10 and 11 (e.g., a plurality of standpipes 364 on first filter layer 326, a plurality of standpipes 364 on second filter layer 342, etc.). As shown in the embodiment of FIG. 13, each standpipe 364 extends upward to a predetermined height from the floor of filter layer on which it resides (e.g., first filter floor 328 for first filter layer 326, second filter floor 344 for second filter layer 342, etc.). In the event of a blockage in a flow path of a given filter layer, water will tend to accumulate and rise. If the water level reaches the predetermined height of standpipe 364, standpipe 364 provides an overflow path allowing the water to drain from that filter layer to the next lowest filter layer, or to filter body 302 in the case of a blockage on first filter layer 326.

As shown in the embodiment of FIG. 13, it is desirable that water filter assembly 300 further include a plurality of overflow caps 366, one mounted on top of each standpipe 364. Each overflow cap 366 may further include an overflow cap top 368, an overflow cap side 370 connected to overflow cap top 368, and an overflow cap notch 372. Overflow cap notch 372 may be disposed vertically within overflow cap side 370, permitting overflow water to pass through overflow cap notch 372, but preventing passage of filtration media 362. Advantageously, the described standpipes 364 or overflow caps 366 may permit the passage of water while preventing filtration media 362 from being displaced between layers.

As shown in the embodiment of FIG. 14, pooling compartments 380 are defined by a plurality of ridges 378 connected to the top side of the floor of each filter layer and (e.g., top side 308 of floor 306 of filter body 302, top side 330 of first filter floor 328 of first filter layer 326, top side 346 of second filter floor 344 of second filter layer 342, etc.), thus dividing the floors into one or more pooling compartments 380 within which filtration media 362 resides. When water is introduced into a pooling compartment 380, it remains in the pooling compartment 380 while filtration media 362 treats contaminates until the water level rises above the height of ridge 378 and the water spills into the next pooling compartment 380. This process may repeat until the water ultimately reach outlet hole 316 and exits water filter assembly 300. Advantageously, the described pooling compartments 380 cause increased time of exposure of water to filtration media 362, increasing the effectiveness of water filter assembly 300.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A water filter assembly comprising:
a filter body comprising
a vertical side wall;
a floor having a top side, the floor and the vertical side wall together defining a cavity, wherein the cavity is defined along a vertical plane as a filtered cavity portion and an unfiltered cavity portion;
an outlet hole defined in the floor of the filter body;
a plurality of vertical barriers extending from the top side of the floor, the plurality of vertical barriers defining a plurality of flow paths that converge at the outlet hole;
a plurality of cutouts defined in an upper portion of the plurality of vertical barriers, each cutout of the plurality of cutouts defining an alternative overflow path permitting water therethrough at a height of the plurality of cutouts;
a first filter layer mounted within the cavity of the filter body, at least a portion of the first filter layer being present within the filtered cavity portion of the filter body and at least a portion the first filter layer being present within the unfiltered cavity portion of the filter body, the first filter layer comprising
a first filter floor having a top side;
a plurality of first filter outlet holes; and
a plurality of first filter vertical barriers extending from the top side of the first filter floor and defining a plurality of first filter flow paths that all originate from the portion of the first filter layer present within the unfiltered cavity portion, a discrete first filter outlet hole being defined at an end of each first filter flow path.

2. The water filter assembly of claim 1, further comprising:
a second filter layer mounted within the cavity of the filter body, at least a portion of the second filter layer being present within the filtered cavity portion of the filter body and at least a portion of the second filter layer being present within the unfiltered cavity portion of the filter body, the second filter layer comprising
a second filter floor having a top side,
a second filter outlet hole, and
a plurality of second filter vertical barriers connected to the top side of the second filter floor and defining a plurality of second filter flow paths that converge at the second filter outlet hole,
wherein the first filter layer rests atop the vertical barriers of the filter body and the second filter layer rests atop the first filter layer.

3. The water filter assembly of claim 2, further comprising
a third filter layer identical to the first filter layer and mounted within the cavity of the filter body, wherein the third filter layer rests atop the second filter layer, and
a fourth filter layer identical to the second filter layer and mounted within the cavity of the filter body, wherein the fourth filter layer rests atop the third filter layer.

4. The water filter assembly of claim 1, further comprising a perforated divider mounted on the floor of the filter body between the filtered cavity portion of the filter body and the unfiltered cavity portion of the filter body, the perforated divider defining a plurality of perforations permitting the flow of water therethrough while preventing passage of a filtration media to the unfiltered cavity portion of the filter body.

5. The water filter assembly of claim 2, further comprising:
a plurality of standpipes extending upward from the first filter floor to a first predetermined height and permitting overflow water at the first predetermined height to drain from the first filter layer, and a plurality of standpipes extending upward from the second filter floor to a second predetermined height and permitting overflow water at the second predetermined height to drain from the second filter layer.

6. The water filter assembly of claim 5, further comprising a plurality of overflow caps, each standpipe of the plurality of standpipes being covered by an overflow cap, the overflow cap comprising:
an overflow cap top;
an overflow cap side;
an overflow cap notch disposed vertically within the overflow cap side; and
wherein the overflow cap notch permits water therethrough while preventing a filtration media therethrough.

7. The water filter assembly of claim 1, wherein the filter body further comprises a filter body cap connected to a top of the vertical side wall and covering the filtered cavity portion of the filter body.

8. The water filter assembly of claim 1, wherein the filter body further comprises a fluid outlet valve attached to the floor of the filter body and covering the outlet hole, the outlet hole being within the unfiltered cavity portion of the filter body.

9. The water filter assembly of claim 2, further comprising a plurality of ridges connected to the top side of the floor of the filter body, the top side of the first filter floor, and the top side of the second filter and dividing the floor of the filter body, the first filter, and the second filter floor into a plurality of pooling compartments within which a filtration media resides.

10. A water filter assembly comprising:
a filter body comprising
a vertical side wall,
a floor having a top side, the floor and the vertical side wall together defining a cavity, wherein the cavity is defined along a vertical plane as a filtered cavity portion and an unfiltered cavity portion,
an outlet hole defined in the floor of the filter body,
a plurality of vertical barriers extending from the top side of the floor, the plurality of vertical barriers defining a plurality of flow paths that converge at the outlet hole,
a first filter layer mounted within the cavity of the filter body, at least a portion of the first filter layer being present within the filtered cavity portion of the filter body and at least a portion of the first filter layer being present within the unfiltered cavity portion of the filter body, the first filter layer comprising
a first filter floor having a top side,
a plurality of first filter outlet holes, and
a plurality of first filter vertical barriers extending from the top side of the first filter floor and defining a plurality of first filter flow paths that all originate from the portion of the first filter layer present within the unfiltered cavity portion, a discrete first filter outlet hole being defined at an end of each first filter flow path.

11. The water filter assembly of claim 10, further comprising
a second filter layer mounted within the cavity of the filter body, at least a portion of the second filter layer being present within the filtered cavity portion of the filter body and at least a portion of the second filter layer being present within the unfiltered cavity portion of the filter body, the second filter layer comprising
a second filter floor having a top side,
a second filter outlet hole, and
a plurality of second filter vertical barriers extending from the top side of the second filter floor and defining a plurality of second filter flow paths that converge at the second filter outlet hole,
wherein the first filter layer rests atop the vertical barriers of the filter body and the second filter layer rests atop the first filter layer.

12. The water filter assembly of claim 11, wherein the plurality of first filter vertical barriers and the plurality of second filter vertical barriers are identical in quantity and arrangement.

13. The water filter assembly of claim 11, further comprising a plurality of perforated dividers, a perforated divider mounted on each of the floor of the filter body, the first filter floor, and the second filter floor, each of the perforated dividers being mounted between the filtered cavity portion and the unfiltered cavity portion of the filter body and defining a plurality of perforations permitting the flow of water therethrough while preventing passage of a filtration media to the unfiltered cavity portion of the filter body.

14. The water filter assembly of claim 11, further comprising
a plurality of standpipes extending upward from the first filter floor to a first predetermined height and permitting overflow water at the first predetermined height to drain from the first layer, and
a plurality of standpipes extending upward from the second filter floor of each second filter layer to a second predetermined height and permitting overflow water at the second predetermined height to drain from the second filter layer.

15. The water filter assembly of claim 14, further comprising a plurality of overflow caps, each standpipe of the plurality of standpipes being covered by an overflow cap, the overflow cap comprising:
an overflow cap top;
an overflow cap side;
an overflow cap notch disposed vertically within the overflow cap side; and
wherein the overflow cap notch permits water therethrough while preventing a filtration media therethrough.

16. The water filter assembly of claim 10, wherein the filter body further comprises a filter body cap connected to a top of the vertical side wall and covering the filtered cavity portion of the filter body.

17. The water filter assembly of claim 10, wherein the filter body further comprises a fluid outlet valve attached to the floor of the filter body and covering the outlet hole, the outlet hole being within the unfiltered cavity portion of the filter body.

18. The water filter assembly of claim 11, further comprising a plurality of ridges connected to the top side of the floor of the filter body, the top side of the first filter floor, and the top side of the second filter and dividing the floor of the filter body, the first filter, and the second filter floor into a plurality of pooling compartments within which a filtration media resides.

19. A refrigerator appliance comprising:
a cabinet;
an insulated chamber mounted within the cabinet;
an icemaker mounted within the insulated chamber; and a water filter assembly for filtering water from the ice maker, the water filter assembly comprising;
a filter body comprising
a vertical side wall,
a floor having a top side, the floor and the vertical side wall together defining a cavity, wherein the cavity is divided along a vertical plane into a filtered cavity portion and an unfiltered cavity portion,
an outlet hole defined in the floor of the filter body,
a plurality of vertical barriers extending from the top side of the floor, the vertical barriers and floor defining a plurality of flow paths that converge at the outlet hole, and
a first filter layer mounted within the cavity of the filter body, at least a portion of the first filter layer being present within the filtered cavity portion of the filter body and at least a portion the first filter layer being present within the unfiltered cavity portion of the filter body, each first filter layer comprising
a first filter floor having a top side,
a plurality of first filter outlet holes, and
a plurality of first filter vertical barriers extending from the top side of the first filter floor and defining a plurality of first filter flow paths that all originate from the portion of the first filter layer present within the unfiltered cavity portion, a discrete first filter outlet hole being defined at an end of each first filter flow path.

* * * * *